US008855289B2

(12) United States Patent
Kaplan et al.

(10) Patent No.: US 8,855,289 B2
(45) Date of Patent: Oct. 7, 2014

(54) AUTOMATED CALLBACK REMINDER (75) Inventors: Ori Kaplan, Haifa (IL); Guy Weintraub, Haifa (IL); Guy Merin, Haifa (IL); Elad Ziklik, Haifa (IL)

(73) Assignee: Microsoft Corporation, Redmond, WA (US)

( * ) Notice: Subject to any disclaimer, the term of this patent is extended or adjusted under 35 U.S.C. 154(b) by 536 days.

(21) Appl. No.: 12/689,260

(22) Filed: Jan. 19, 2010

(65) Prior Publication Data
US 2011/0176670 A1 Jul. 21, 2011

(51) Int. Cl.
H04M 3/42 (2006.01)
H04M 1/725 (2006.01)

(52) U.S. Cl.
CPC .. H04M 3/42195 (2013.01); H04M 2203/2072 (2013.01); H04M 1/72583 (2013.01); H04M 1/72566 (2013.01)
USPC .................................. 379/210.01; 455/414.1

(58) Field of Classification Search
CPC ... H04M 3/42195; H04M 3/424; H04M 3/48; H04M 3/523; H04M 1/27; H04M 2203/2072; H04M 2207/18; H04W 8/18
USPC ............. 379/201.01, 201.05, 201.12, 207.02, 379/207.03, 210.01, 209.01; 455/414.1
See application file for complete search history.

(56) References Cited

U.S. PATENT DOCUMENTS

| 6,212,268 | B1 | 4/2001 | Nielsen |
| 6,317,593 | B1 | 11/2001 | Vossler |
| 7,145,998 | B1 | 12/2006 | Holder et al. |
| 7,155,002 | B2 | 12/2006 | Hagiwara |
| 2002/0128036 | A1 | 9/2002 | Yach et al. |
| 2003/0028684 | A1 | 2/2003 | Segev et al. |
| 2004/0078486 | A1 | 4/2004 | Salahshoor et al. |
| 2005/0188140 | A1 | 8/2005 | Hitchcock et al. |
| 2006/0167729 | A1 | 7/2006 | Rafter et al. |
| 2008/0132221 | A1 | 6/2008 | Willey |
| 2010/0158220 | A1* | 6/2010 | Silverman .................. 379/88.22 |
| 2010/0246785 | A1* | 9/2010 | Wang et al. ................ 379/88.23 |

FOREIGN PATENT DOCUMENTS

WO 0213547 A2 2/2002

OTHER PUBLICATIONS

"Call Back Reminder 4.0", Retrieved at<<http://pda.wareseeker.com/Business/call-back-reminder-4.0.zip/316676>>, May 8, 2006, pp. 1-2.
"Instant Call Back", Retrieved at<<http://www.digicelfiji.com/en/plans/addons/instant-call-back>>, Jul. 29, 2009, pp. 1-2.
International Search Reported in corresponding PCT Application No. PCT/US2011/020288, dated Sep. 27, 2011, 9 pages.

* cited by examiner

*Primary Examiner* — Antim Shah
(74) *Attorney, Agent, or Firm* — Bryan Webster; Kate Drakos; Micky Minhas (57) ABSTRACT

A call reminder functionality is provided by an arrangement that is operable with a network-enabled communication device in which a reminder to return a phone call can be generated in an automated manner upon the occurrence of a call event. When the call event occurs, an option is displayed on a user interface ("UI") on the device to create a link between the call and the user's schedule application. If the user selects the option, a callback task is added to the user's task list maintained by the schedule application, and a reminder to make the callback is generated and then displayed on the UI at a future time. The reminder includes pertinent call information and also includes a button that enables the user to place the callback through the UI (i.e., a "one-click call back").

16 Claims, 11 Drawing Sheets

AUTOMATED CALLBACK REMINDER

BACKGROUND

Modern communication networks have provided users with a vast array of features and functions that make staying connected with friends, families, colleagues, and others easy, convenient, and inexpensive. A wide variety of devices such as mobile phones, smart phones, personal computers ("PCs"), and other network-enabled devices is available which let users surf the Web to access sources of information and entertainment, send e-mails and instant messages, as well as communicate with calls to other users. Moreover, as wireless infrastructure has broadened its reach, and as devices become feature-rich, smaller, and more portable, users can be reached virtually at any time and at any place.

While most users appreciate the benefits of such heightened connectivity and accessibility, the phone can ring at inconvenient times. For example, the user may be in a meeting, attending a show or sporting event, driving a car, or engaged in some other activity in which the user does not wish to be interrupted. But if the user chooses to not answer a call, it can often be difficult to remember to return the call. And when the user does remember to make the callback, it is not always convenient to access the relevant phone number to call. For example, the user may have to manually browse through an incoming call log to find the caller and phone number to call back.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

A call reminder functionality is provided by an arrangement that is operable with a network-enabled communication device such as a mobile phone in which a reminder to return a call can be generated in an automated manner upon the occurrence of a call event such as an incoming call, rejected call, call waiting, missed call, a short call (i.e., one that does not reach a set minimum duration), and the like. When such a call event occurs, an option is displayed on a user interface ("UI") on the device to create a link between the call and the user's schedule that may be maintained, for example, by a schedule application.

If the user selects the option, a callback task can be added to the user's task list (i.e., "to do" list) supported by the schedule application, and a reminder to make the callback is set and displayed on the UI at a future time. For example, the reminder can be provided at some predefined time interval such as 30 minutes later, the next day, etc., or at a free time slot in the user's schedule. The reminder includes pertinent call information (for example, the name of calling party, phone number, date/time of the last incoming call) and includes a button or similar control element that enables the user to place the callback through the UI (i.e., a "one-click callback").

In various illustrative embodiments, the call reminder functionality is provided by an application that can run as a thick client on the communication device, or alternatively as a thin client that splits storage of the application code and execution between the device and a server that operates remotely from the device, for example, through implementation as a service on the network "cloud." The call reminder application will expose a UI that enables the user to set preferences (for example to set which types of call events will trigger the call reminder application, set the number of rings before the application is launched, specify the predefined time interval, and the like) and other default application behavior. The UI can also enable the user to work through various call handling options when the application is triggered upon the occurrence of a qualifying call event.

The call reminder application typically operates in the background using a listener that monitors call events. When a qualifying call event occurs, the application is triggered and will fetch and store call information such as metadata (e.g., phone number of caller, date/time of call) and matching contact information (e.g., caller's name/nickname, phone number association—work, mobile, home, etc.). A notification on the UI is displayed to give the user the option to add a callback task for that caller. If the user selects the option, the call reminder application will call various functions at an API (application programming interface) exposed by the schedule application and pass the appropriate parameters to create a callback task and set a reminder.

In some embodiments, the call reminder application can query the schedule application to automatically find an open slot in the user's schedule (or a slot meeting other user-specified criteria) in which the callback reminder can be inserted. Alternatively, the user can be given an option to manually browse the calendar to find a time slot of the user's choosing. In other embodiments, the reminder will be set at some predefined time that can be set by default or through user interaction with the UI at the time of the notification. When the set time for the callback reminder is reached, the application will display the reminder through the UI on the device and typically display the fetched call information as well. The call reminder application will also display a button or other control element to implement the one-click callback feature when activated.

The call reminder application provides a rich feature set to the user that provides a convenient and helpful alternative to handle incoming, rejected, and missed calls. The user can stay organized and keep current with voice communications with a few clicks without having to manually look through call records to find needed information. In addition, the ability of the call reminder application to automatically interface with others of the user's applications running on the communications device advantageously ensures that the user experience is seamless and the generated tasks and reminders are consistent with the user's schedule.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
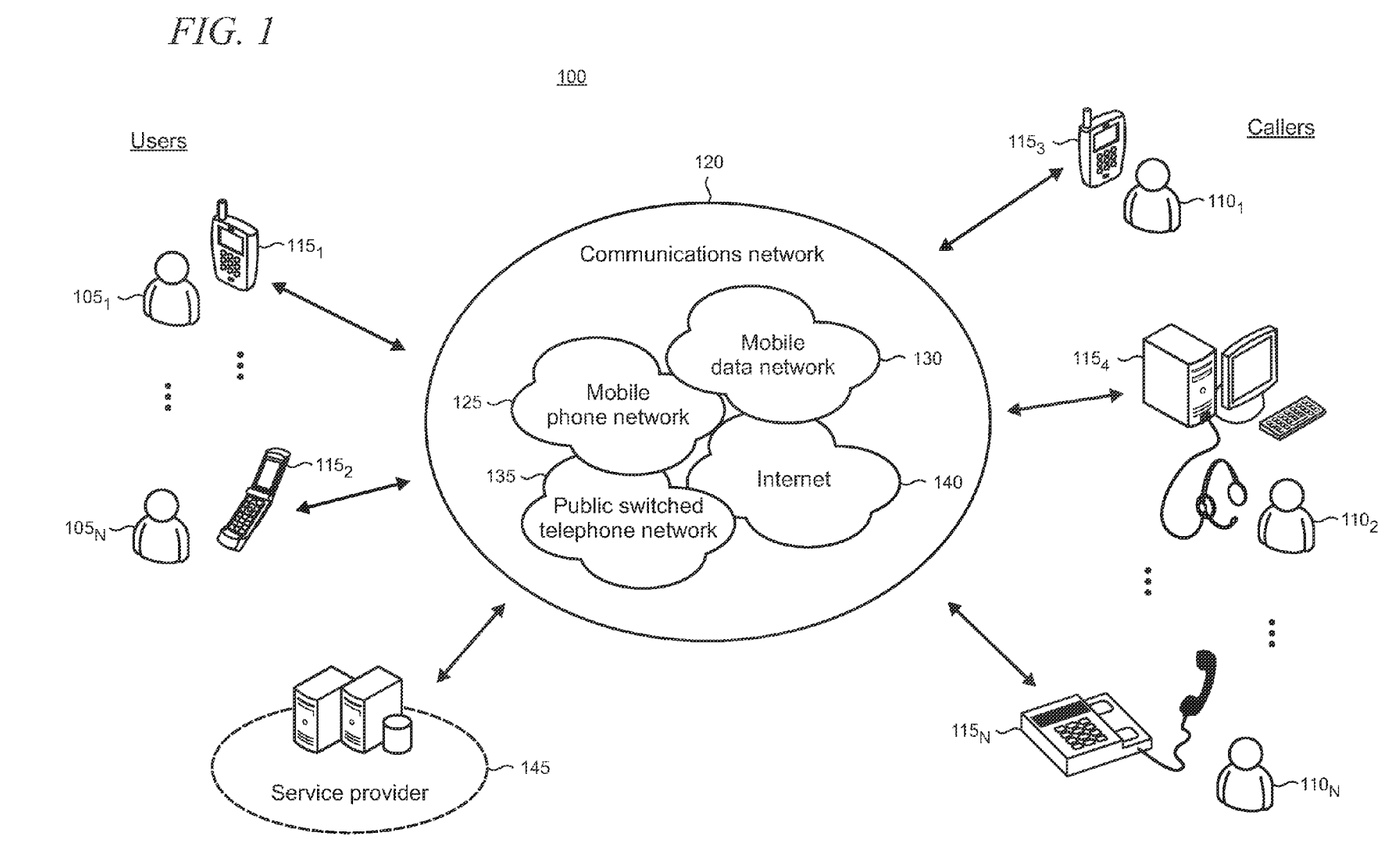
FIG. 1 shows an illustrative communications environment in which device users and callers may communicate using network-enabled devices such as mobile phones, PCs, and landline phones.

In the drawings, in which like reference numbers indicate the same element, FIG. 1 shows an illustrative communications environment 100 in which users $105_{1 \ldots N}$ and callers $110_{1, 2 \ldots N}$ may communicate using respective network-enabled devices $115_{1, 2 \ldots N}$ that are each operatively coupled to a communications network 120. The devices 115 may include any of a variety of devices and platforms which support voice communications such as mobile phones, smart phones, PCs, landline telephones, or other mobile or fixed devices that are adapted for voice telephony over a network. In this particular exemplary embodiment, the term "user" refers to a user of the present call reminder application who receives a phone call from a person making the call termed the "caller."

In one embodiment, the present call reminder application is arranged to execute on a mobile device such as a mobile phone, telephony-capable personal digital assistant, smartphone, or other portable device that is capable of making or receiving calls (collectively referred to hereafter as a "mobile phone") that is configured as a Microsoft Windows® CE-based device. However, the principles of the present arrangement may also be adapted for use with other devices using other operating systems. For example, such operating systems may include Symbian, iPhone/Mac, Palm, Blackberry, Android, and other Linux- or Unix-based operating systems. It is further noted that the term "call" as used herein is intended to refer to any of a variety of call types including voice calls, video calls, multimedia calls, conference calls (i.e., voice/video/multimedia calls among multiple parties), messaging, and other forms of communication that are typically conducted in real time or near real time.

The communications network 120 that is used to facilitate communication among the users 105 and callers 110 may include portions of one or more network types as shown in FIG. 1, including a mobile phone network 125, mobile data network 130, public switched telephone network 135, and Internet 140. Therefore, for example, a given caller 110 may call a given user 105 using a conventional telephone where the call is carried over portions of both the public switched telephone network 135 and mobile phone network 125. Alternatively, another caller 110 may call the user 105 using a PC equipped with VoIP (Voice over Internet Protocol) capability where the call is carried over the Internet 140 and mobile phone network 125. Indeed, various combinations of network types or single networks can be utilized as may be necessary to transport a given phone call.

A service provider 145 is also supported in the communications environment 100. The service provider 145 may be utilized in usage scenarios in which portions of the present call reminder application functionality are distributed to one or more external, remotely-located servers. Such usage scenarios are described in more detail below in the text accompanying FIGS. 13 and 14.

Figure 2:
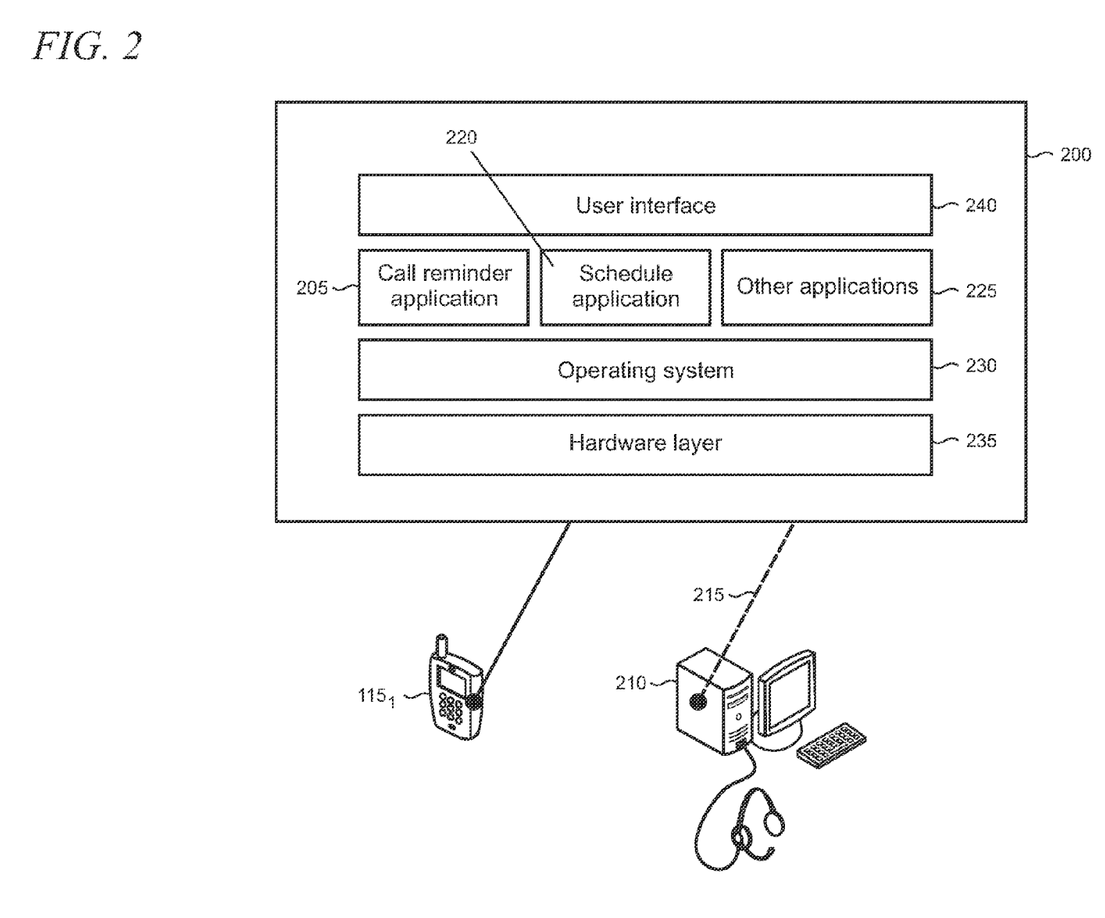
FIG. 2 shows an illustrative architecture, including a call reminder application, that may be implemented on a network-enabled communication device such as a mobile phone.

FIG. 2 shows an illustrative architecture 200 of major functional components which are used to facilitate the present arrangement, including a call reminder application 205, that may be implemented on a network-enabled communication device such as a mobile phone $115_1$, as described above. Although the architecture 200 shown in FIG. 2 is particularly adapted for the mobile phone $115_1$, the principles it illustrates can be expected to have general applicability to other platforms such as, for example, a PC 210, as indicated by the dashed line 215. In this exemplary embodiment, the call reminder application 205 executes on the mobile phone $115_1$ along with a schedule application 220 and other applications as collectively indicated by reference number 225. The schedule application 220 may be embodied, for example, in commercially available software such as Microsoft Corporation's Outlook® messaging and collaboration client. However, other types of applications which support scheduling, calendar, and task management functionality either singly or in combination may also be used depending on the requirements of a given usage scenario. These may include, for example, Google Calendar, Apple Mac iCal, Mozilla Sunbird and Thunderbird/Lightning, Blackberry Calendar, Palm Month-Planner, and the like. The applications can be web-based in some cases.

Supporting the applications 205, 220, and 225 in the architecture 200 are an operating system 230 and a hardware layer 235. In this exemplary embodiment, the operating system 230 is particularly adapted to operate on a resource-limited device. The hardware layer 235 provides an abstraction of the hardware implemented on the mobile phone $115_1$ (such as computer- or machine-readable storage media, processor, etc.) to the operating system 230 and applications 205, 220, and 225 above it. A UI 240 is also provided by the architecture 200 to support user interactivity and facilitate an effective user experience, and will typically be embodied as a graphical user interface.

Portable platforms such as mobile phones are commonly equipped with synchronization capability in order to provide a process for synchronizing data between, for example a Windows-based PC and the portable platform (which may be Windows CE-based, as described above). Using timestamps and user preferences, the synchronization process tracks the data changes on both devices, and then transfers the appropriate data so that each machine has the most-recent versions. Outdated or unwanted data is typically discarded. Such synchronization capability is often convenient given that a user will typically use one device at a time but wants to keep both devices up to date with data, files, contacts, tasks, reminders, schedules, and the like. For example, a user may keep task lists and contact information (e.g., addresses, phone numbers, and the like of friends, colleagues, family, etc.) on both his or her mobile phone and PC and wants to make sure that changes made to a task list using the mobile phone are reflected on the PC.

Figure 3:
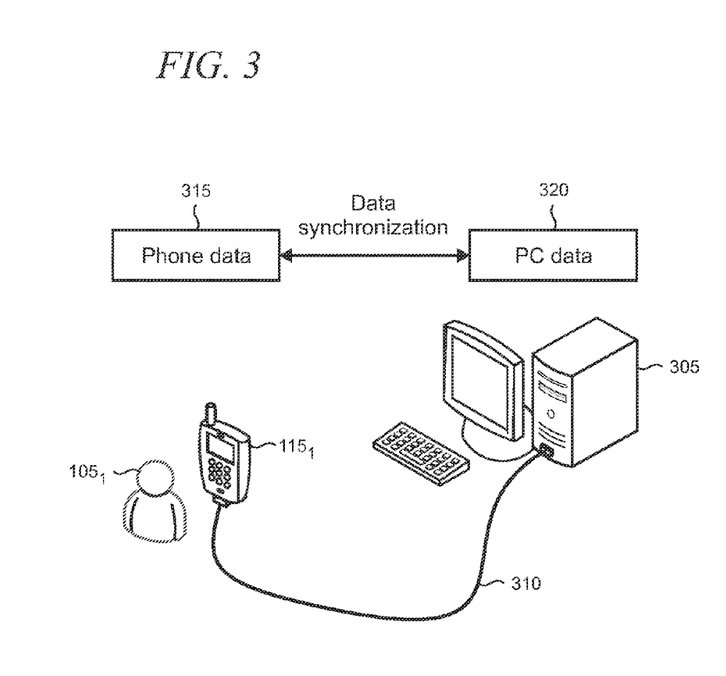
FIG. 3 shows an illustrative arrangement in which a mobile phone may be coupled with a PC to support synchronization of data between the devices so that both have the most-recent data versions.

As shown in FIG. 3, the mobile phone $115_1$ is coupled to the user's PC 305 using a cable connection 310 employing a serial or USB (Universal Serial Bus) protocol. Connectivity may also be implemented using a wireless connection (e.g., wireless Ethernet) or infrared (e.g., IrDA—Infrared Data Association). Typically, a data synchronization application which has components that run on each device is utilized to synchronize phone data 315 with PC data 320, as shown.

Figure 4:
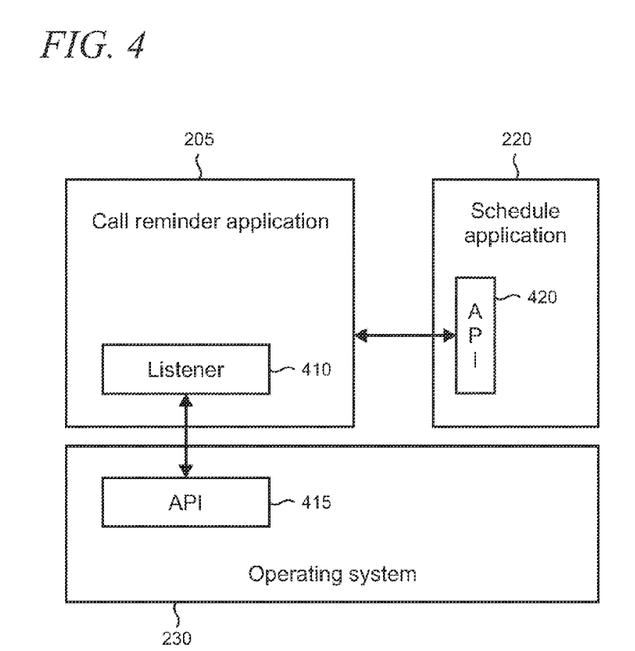
FIG. 4 shows illustrative interfaces that are utilized among various functional components operating on a network-enabled device.

FIG. 4 shows several illustrative interfaces that are implemented among various functional components operating on the mobile phone $115_1$. The call reminder application 205 will typically register a listener 410 with the operating system 230 through an API 415 in order to monitor call activity on the mobile phone $115_1$. The call reminder application 205 will also typically interact with other applications executing on the mobile phone $115_1$ by APIs that are respectively exposed by the other applications. For example, as shown in FIG. 4, a representative API 420, which is exposed by schedule application 220, enables the call reminder application 205 to invoke various functions, pass parameters, and exchange data with the schedule application 220.

Figure 5:
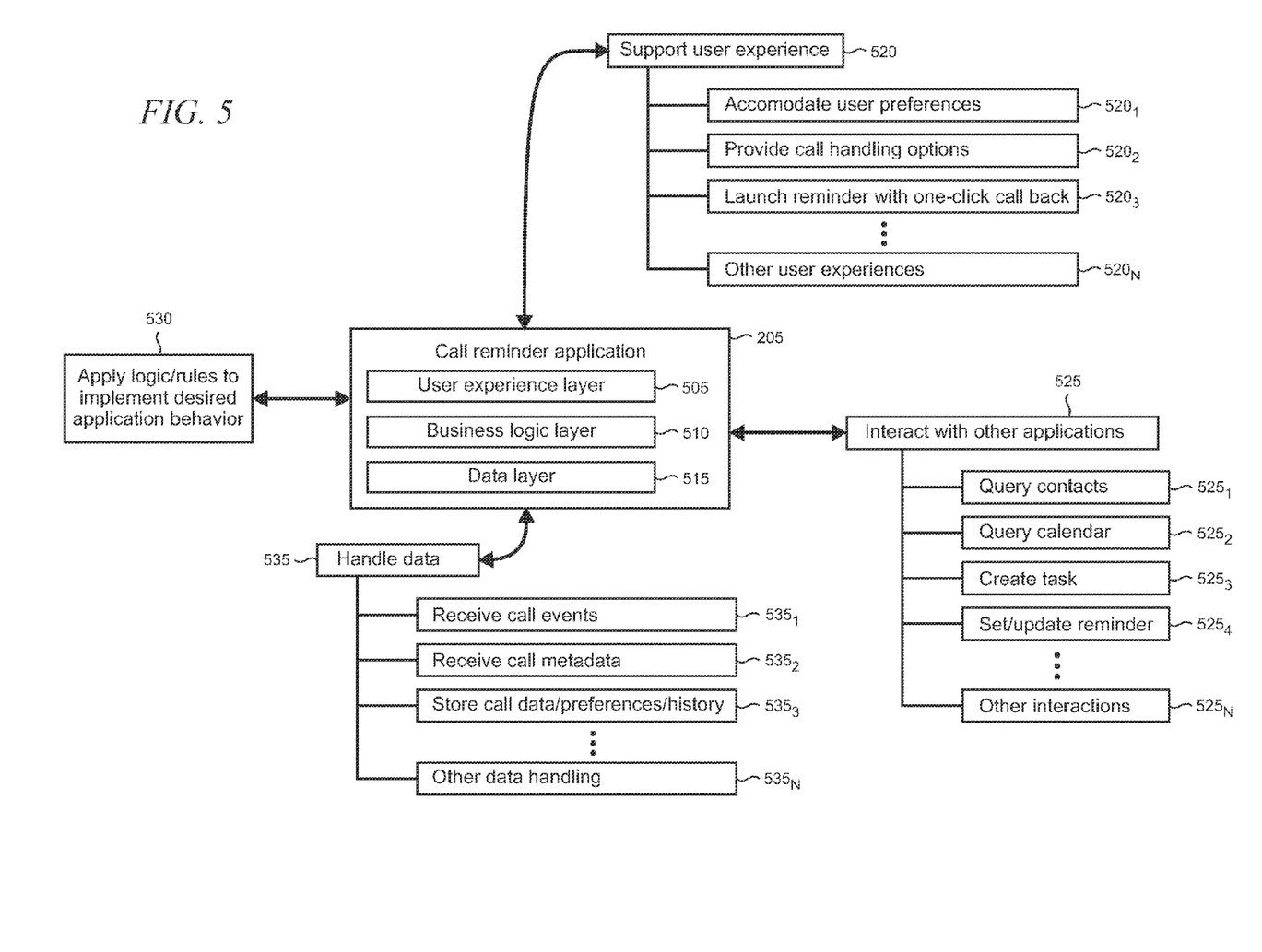
FIG. 5 shows an illustrative set of functional components in the call reminder application and various illustrative features, functionalities, and interfaces supported by the call reminder application.

FIG. 5 shows an illustrative set of functional components which comprise the call reminder application 205. The components include a user experience layer 505, business logic layer 510, and data layer 515. It is particularly pointed out that the functional components shown in FIG. 5 are merely illustrative and that other components may also be used in various combinations depending on the needs of a given embodiment or usage scenario and to provide the features and functionalities described herein. The functional components in the call reminder application 205 are generally configured to support a variety of features, functionalities, and interfaces including supporting a user experience, interacting with other applications, applying logic and rules to implement the desired behavior of the application, and handling data as respectively indicated by reference numbers 520, 525, 530, and 535.

Figure 13:
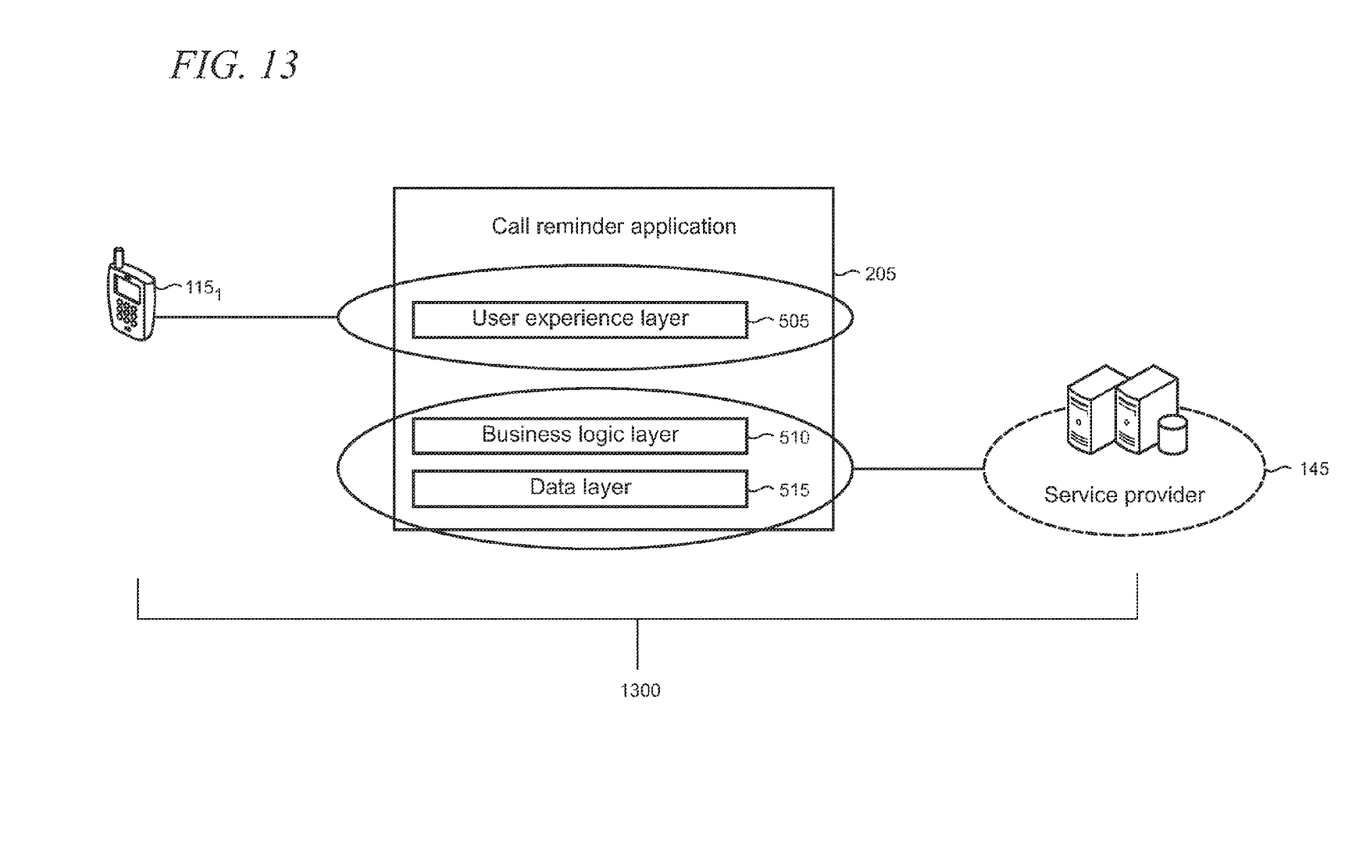
FIG. 13 shows the call reminder application as illustratively arranged as a thin client on a network-enabled device such as a mobile phone.
Figure 14:
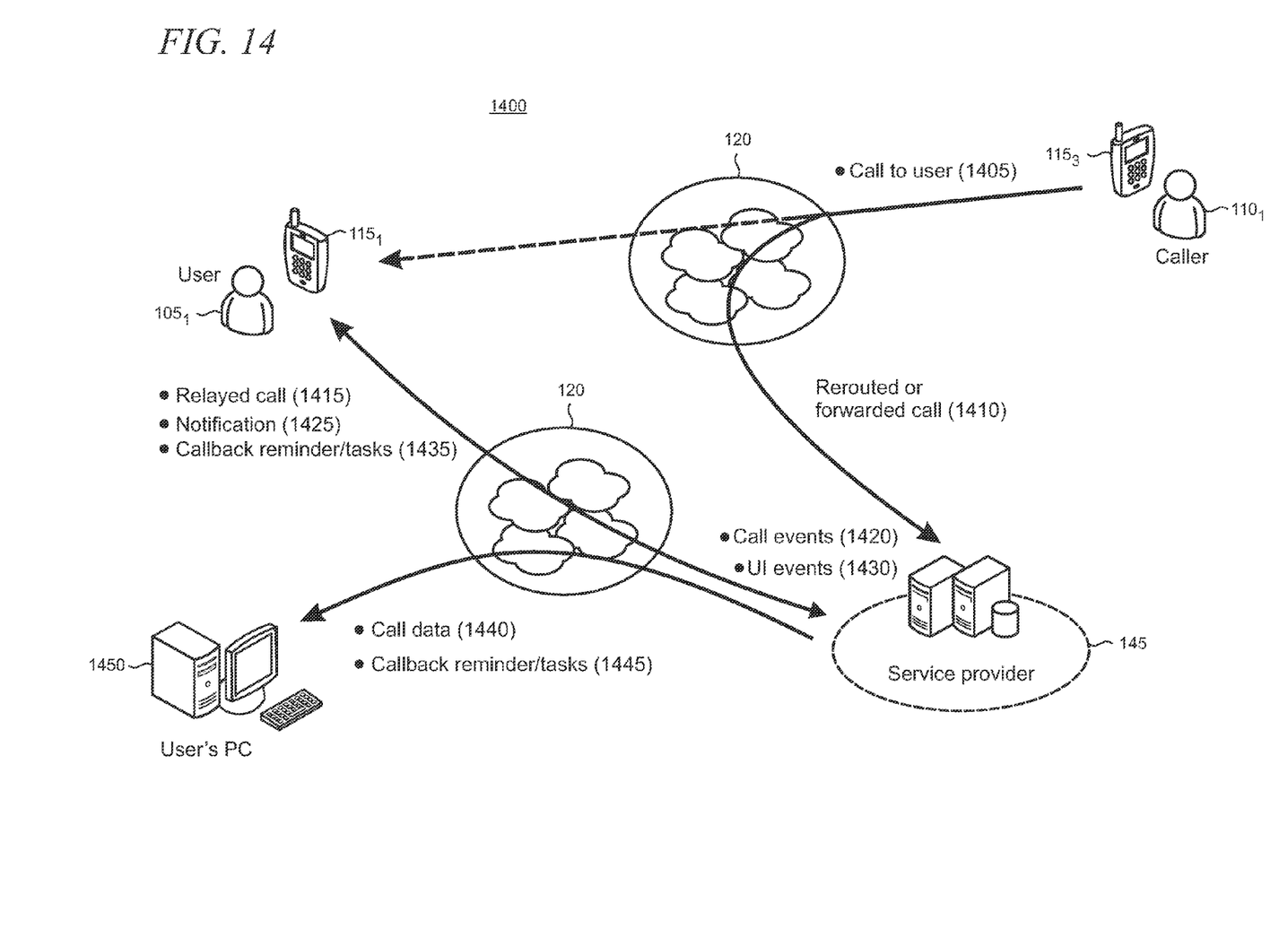
FIG. 14 shows an illustrative arrangement in which certain functionality of the call reminder application is supported by a service provider that is operatively coupled to the communications network.

As shown in FIG. 5, the functional components in this particular exemplary embodiment are implemented, at least in part, by computer-executable code which is written to one or more storage media that are disposed on the mobile phone $115_1$ and which execute via one or more processors that are included in the phone's hardware. In this regard, accordingly, the arrangement shown is considered as a "thick client" as the code implemented by the functional components executes substantially in its entirety on the mobile phone $115_1$ in order to provide the as-designed user experience and application behavior. In alternative implementations, the functional components are configured in a distributed computing arrangement and the code on the mobile phone $115_1$ will be executed from a thin client. This alternative is shown in FIGS. 13 and 14 and described in the portion of this specification below that accompanies those drawings.

As shown, the call reminder application 205 supports a user experience by accommodating user preferences $520_1$, providing call handling options when a call event occurs $520_2$, launching a reminder with the one-click callback feature at an appropriate time $520_3$, and providing other user experiences as may be required to meet a given usage scenario $520_N$. The user preferences and call handling options are described in more detail below in the descriptions of FIGS. 6 and 7.

The call reminder application 205 may also interact with other applications which execute on the mobile phone $115_1$. In this particular exemplary embodiment, the call reminder application 205 typically interacts with the schedule application 220 in order to create tasks and set reminders. However, interactions with other applications may also be utilized in a similar manner as described here. In many usage scenarios, the call reminder application 205 will implement queries such as querying a contact list $525_1$ to identify a user's contact that is associated with a call event, querying a calendar functionality to find open timeslots in the user schedule $525_2$, creating tasks in the user's task list $525_3$, setting and updating reminders $525_4$, and supporting various other interactions $525_N$ as may be needed to support the features described here.

The call reminder application 205 will generally apply business logic and rules to implement the desired behavior of the application as indicated by reference number 530. Application of the business logic and rules will typically implement a variety of routines, processes, and workflows in response to the occurrence of a call event as monitored by the listener 410 to support the user experiences described above.

Various data handling functions are also supported by the call reminder application 205 including receiving call events $535_1$ and associated information such as call metadata $535_2$. The call reminder application 205 will generally store call data, either on a temporary or persistent basis, as well as user preferences and usage histories $535_3$ in some cases. Other data handling may also be performed as indicated by reference number $535_N$, to meet the needs of a given usage scenario.

Figure 6:
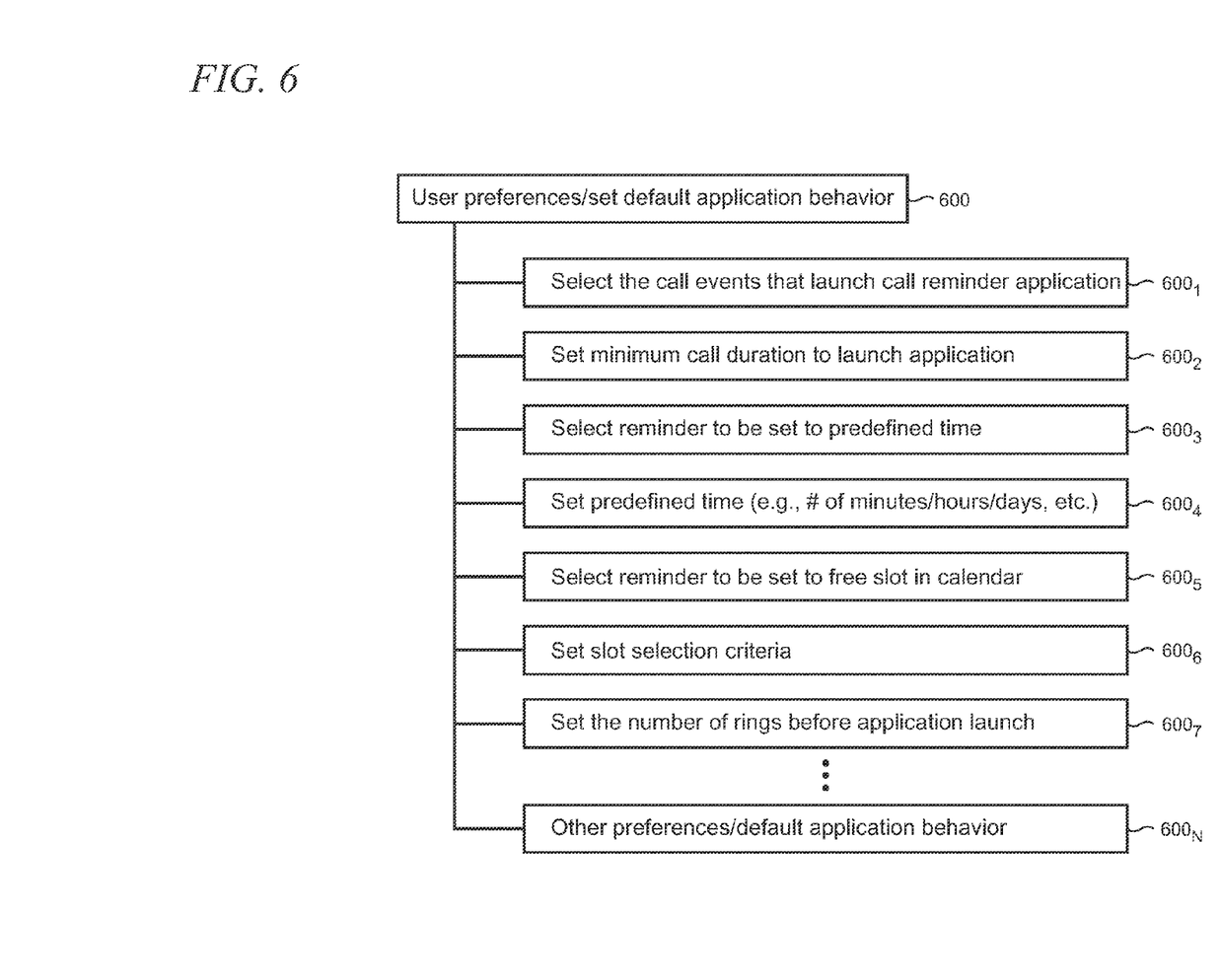
FIG. 6 is an illustrative taxonomy of user preferences and default application behaviors that may be utilized by the call reminder application.

FIG. 6 is an illustrative taxonomy 600 of user preferences and default call reminder application behaviors that may be utilized by the call reminder application. The user preferences and default application behaviors shown in the drawing are illustrative and the particular user preferences and behaviors utilized in any given usage scenario may vary from what is shown and described here.

The user can often be expected to set preferences when first setting up the call reminder application 205 in order to establish how the application will behave by default (i.e., during subsequent instances of application launch). However, the call reminder application is typically configured to enable preferences to be changed at any time. As shown in FIG. 6, the user can select the call events that will launch the call reminder application 205 upon their occurrence (as indicated by reference number $600_1$). Call events can include, for example, an incoming call to the mobile phone $115_1$, an incoming call while the phone is in use (i.e., "call waiting"), a call that is rejected by the user, a missed call, a call in which the user turns the ringer off (e.g., by pressing a "silent" or mute button), and the like.

In addition, in some implementations a call that is answered by a user but is of short duration (where "short" can be an arbitrary value or be set by the user in some cases) may also be considered a call event that will trigger a callback reminder. For example, a call lasting 10 seconds or less may presumably be short enough to warrant additional conversation at a later time (i.e., the user may answer the call to say "I can't talk right now, but I'll call you back later"). In such implementations, the user may optionally be given an option to set the minimum call duration which will trigger the launch of the call reminder application ($600_2$).

The user can select the callback reminder to be set to a predefined time ($600_3$). If this option is chosen, then typically the user may be given an ability to set the predefined time ($600_4$) by picking from a number of set menu choices or setting a specific value. For example the user may set the callback reminder to be launched at some number of minutes, hours, days, etc., after the occurrence of a call event.

The user may alternatively set the callback reminder to be set to a free slot in the user's schedule ($600_5$). In some instances, the default application behavior may be that the callback reminder is inserted into the first available free slot in the user's schedule. In other cases, a user may be given options to specify slot selection criteria ($600_6$). For example the callback reminder might be inserted into the first available slot that is after a certain time (i.e., the callback reminder will be launched only in the evening after normal work hours), or on certain days (e.g., on the weekend). In some implementations, it may be desirable to enable the user to assign priorities to the generated tasks and/or callback reminders and the slot selection can be based on prioritization.

The user may typically be enabled to set the number of rings that occur with an incoming call before the call reminder application is launched ($600_7$). Setting a larger number of rings will mean that the user will have more time to deal with an incoming call in a conventional manner (i.e., answer the call, reject the call, etc.) before the application is launched and the user is given the option to generate a task and callback reminder. Other user preferences and default application behavior settings can also be exposed to the user ($600_N$) as may be needed to meet the requirements of a given usage scenario.

Figure 7:
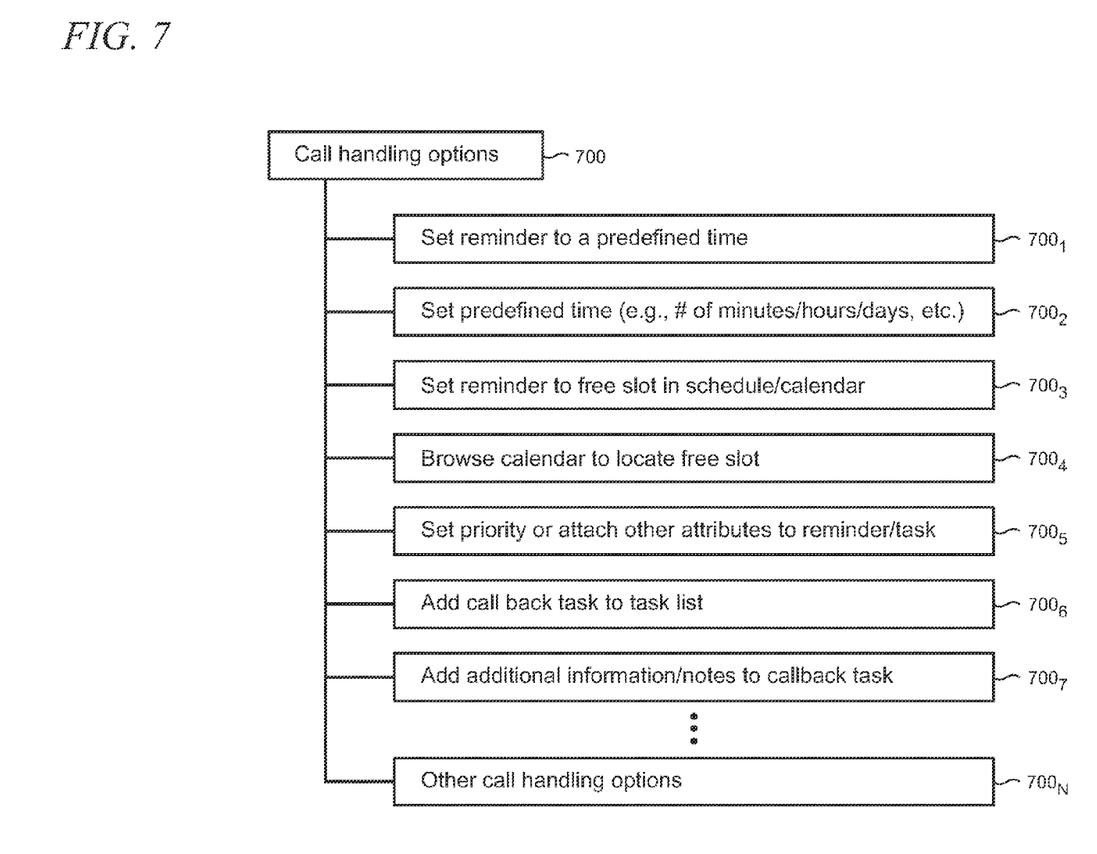
FIG. 7 is an illustrative taxonomy of call handling options that may be utilized by the call reminder application.

FIG. 7 is an illustrative taxonomy 700 of call handling options that may be utilized by the call reminder application upon the occurrence of a qualifying call event (where a call event is deemed "qualified" when it triggers the call reminder application either by default behavior or via selection by the user). The call handling options shown in the drawing are illustrative and the particular options utilized in any given usage scenario may vary from what is shown and described here. In some implementations, it may be desirable to enable the user to set a time for the callback reminder to be launched as a given call event is being handled rather than relying on a default time or one which is selected via a user preference in advance of the event.

Accordingly, the user can be given options to set the callback reminder to launch at a predefined time interval after the call event (as indicated by reference number $700_1$), and specify the time interval (i.e., number of minutes/hours/days, etc.) ($700_2$). Alternatively, the user can specify that the callback reminder be inserted into a free slot in the user's schedule ($700_3$). In this case, the user may be enabled with an ability to browse his or her calendar from the schedule application ($700_4$) to locate an appropriate slot.

In some implementations it may be desirable to expose options to the user upon the occurrence of a qualifying call event to set a priority to a task or callback reminder or attach some other attribute ($700_5$). For example, a callback reminder or task can be prioritized over other reminders and tasks on the user's schedule, or be given lower priority so that returning phone calls is the last thing the user needs to deal with at the end of the day.

In a similar manner as with the callback reminder, the call reminder application 205 can be configured so that a user may add a callback task in his or her task list as a call handling option that is exposed upon the occurrence of a qualifying call event ($700_6$). In addition, the user may be afforded with an opportunity to add other information or notes to a callback task ($700_7$). For example, the user may want to annotate a callback task with a note that indicates the topic of the call or with other pertinent information (e.g., "call Bill to talk about upcoming class reunion"). Other call handling options can also be exposed to the user ($700_N$) as may be needed to meet the requirements of a given usage scenario.

Figure 8:
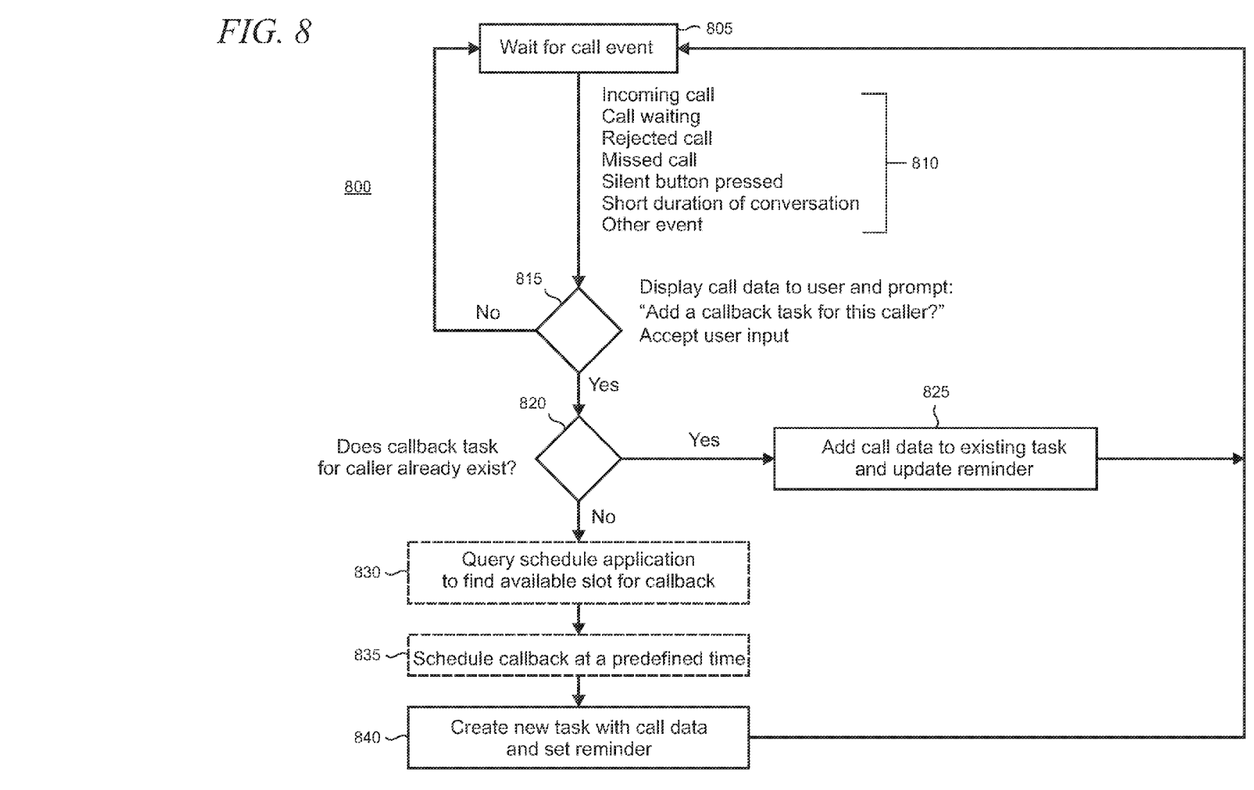
FIG. 8 is a flowchart of an illustrative workflow that may be utilized by the call reminder application.

FIG. 8 is a flowchart of an illustrative workflow 800 that may be utilized by the call reminder application 205. The workflow begins at block 805 where the listener 410 waits for the occurrence of a qualifying call event (a list of illustrative qualifying call events is indicated by reference number 810 in FIG. 8). At decision block 815, when such a call event occurs, the application 205 will fetch the relevant call data, such as identification of the caller and calling number, for display through the UI with the prompt "add callback task for this caller". If the user indicates "No", then workflow control is returned to block 805. If the user indicates "Yes", then at decision block 820, if a callback task for the caller already exists, then call data (such as date and time of the last call) will be added to the existing task and the existing reminder will be updated at block 825 and workflow control returns to block 805.

If a callback task does not already exist, then control passes to block 830 or block 840 (where as indicated by the dashed lines, typically one or the other of the processes will be implemented, but not both). At block 830, the call reminder application 205 queries the schedule application 220 to find an available time slot to set the callback reminder. At block 835, the call reminder application 205 will schedule a callback reminder to occur in a predefined time. At block 840, the call reminder application 205 creates a new task and sets a reminder, either or both of which can be added to the user's task list and schedule that are maintained by the schedule application 220. Workflow control is then returned back to block 805.

Figure 9:
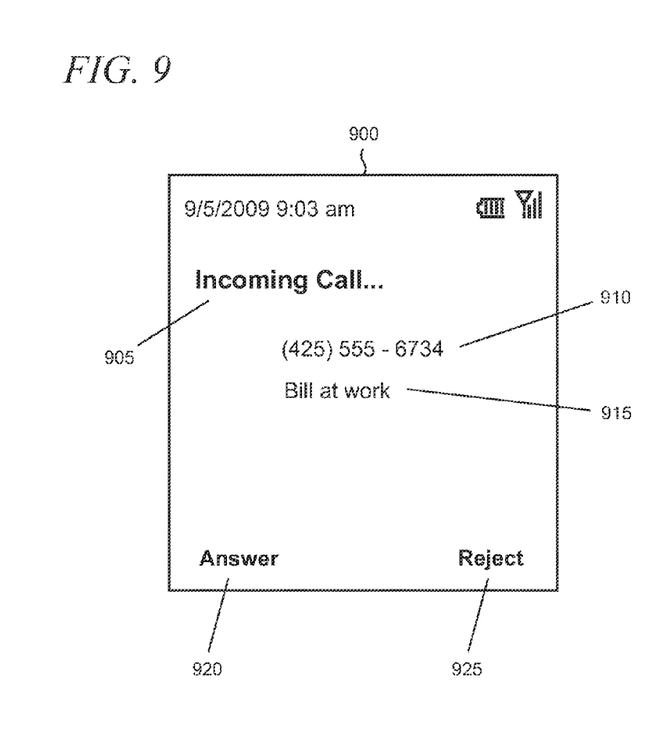
FIGS. 9-12 show various illustrative screenshots of the user interface that is supported by the call reminder application.

FIGS. 9-12 show various illustrative screenshots of the UI that is supported by the call reminder application 205. FIG. 9 shows an exemplary screen shot 900 of the UI when an incoming call 905 is received at the mobile phone $115_1$. In this example, call data including the caller's phone number 910 and identity 915 are displayed. In this example, call handling is implemented in a typical manner by an application operating on the mobile phone $115_1$ which compares the incoming call data to the user's contact list in order to fetch and display the caller's identity. In alternative implementations such call handling functionality could be handled by the present call reminder application 205.

The user is provided with the typical call handling options to either answer an incoming call or reject it by interfacing with the respective "Answer" or "Reject" buttons 920 and 925 which are displayed on the UI. Depending on the hardware configuration of the mobile phone $115_1$, buttons 920 and 925 can be implemented using touch sensitive graphic icons, "soft" keys on the phone, or other various conventional controls.

Figure 10:
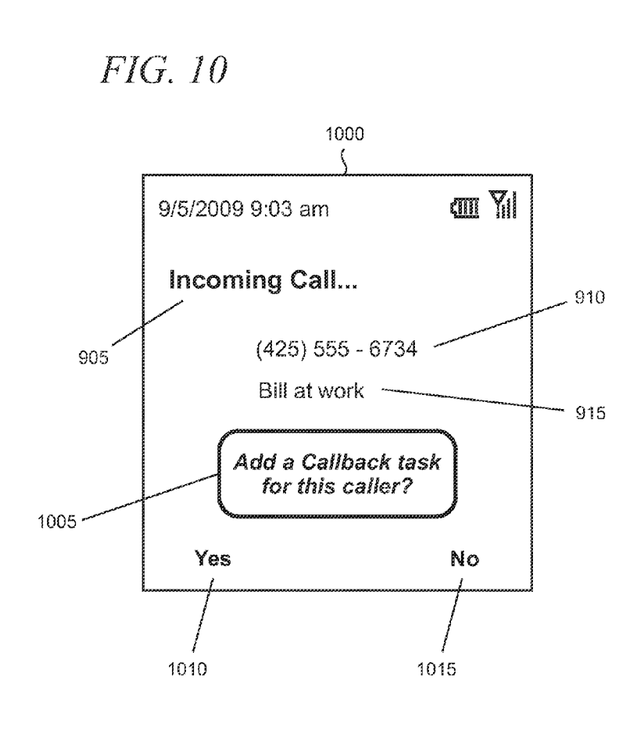

In accordance with the principles of the present arrangement, FIG. 10 shows an exemplary screenshot 1000 of the UI when a prompt 1005 is displayed upon launch of the call reminder application 205 that is triggered by the qualifying call event of the incoming call 905. The prompt 1005 asks the user if a callback task and associated reminder should be generated for this caller. As described above, in one embodiment the call reminder application can be launched upon the completion of a set number of rings associated with the incoming call 905. When the prompt 1005 is displayed, buttons 1010 and 1015 are also displayed to enable the user to implement the callback call handling to set a task and reminder (or not set the task and reminder) as desired.

Figure 11:
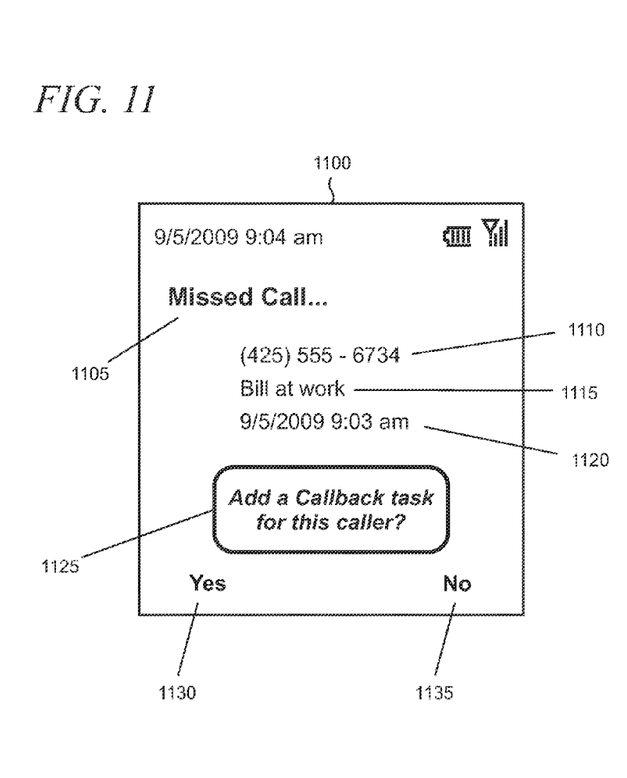

FIG. 11 shows an exemplary screenshot 1100 that shows call handling for a qualifying call event of a missed call 1105. When such an event occurs, the application that supports routine call handling tasks will typically display the number of the missed call 1110, the caller's identity 1115, and the date and time of the missed call 1120. Alternatively, the call reminder application 205 can fetch and display this call data on the UI. As shown, the call reminder application 205 will display a prompt 1125 which asks the caller if a callback task of an associated reminder should be generated for this caller.

When the prompt 1125 is displayed on the UI, buttons 1130 and 1135 are also displayed to enable the user to implement the callback handling to set a task and reminder (or not set a task and reminder) as desired.

Figure 12:
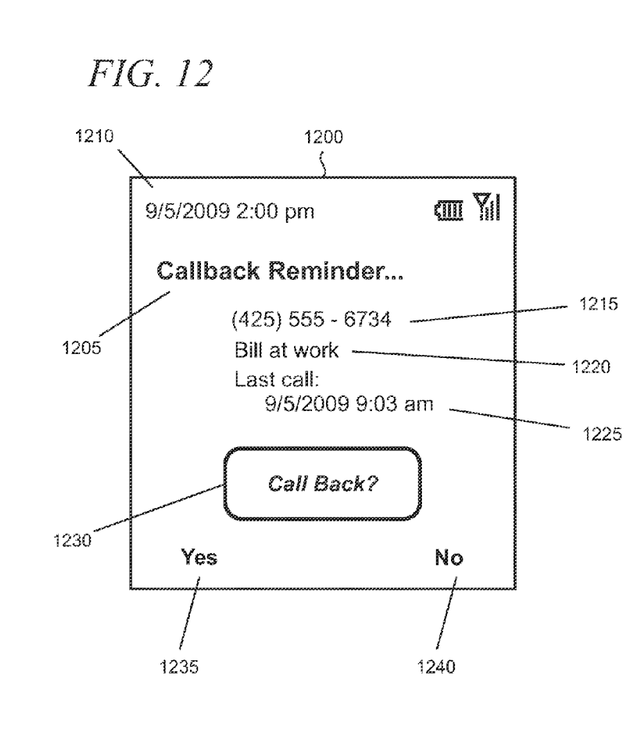

FIG. 12 shows an exemplary screenshot 1200 that shows a callback reminder 1205 for the missed call 1105 shown in FIG. 11. As shown on the clock display 1210, this particular callback reminder was triggered later in the day (2 pm) that the call was missed. Accordingly, 2 pm may have been an open time slot that was selected automatically by the call reminder application 205 as described above, or manually selected by the user when working through various call handling options at the time the missed call event occurred.

The callback reminder will include relevant call data that is fetched and displayed on the UI by the call reminder application 205. In this exemplary embodiment, the call data includes the number of the caller 1215, the identity of the caller 1220, and the date and time of the last call 1225. Also included in the callback reminder is a callback prompt 1230 that enables the user to place the callback (or not place the callback) with the click of the appropriate button 1235 or 1240.

FIG. 13 shows the call reminder application 205 as illustratively arranged as a thin client 1300 on the mobile phone $115_1$. In this case, the functional components and associated code execution are distributed across multiple computing platforms, for example including the mobile phone $115_1$ and one or more servers operated by the service provider 145 shown in FIG. 1. The service provider 145 will typically have access to relevant portions of the communications network 120 in FIG. 1 and be arranged to support the as-designed user experience and application behavior using a distributed or cloud-based computing paradigm.

It is noted that various implementation details will be evident in the functional components when utilized in a distributed computing environment, and as a result, may vary to some degree from their counterparts used in the thin client application described above. As shown, typically only the user experience layer 505 will be resident and associated code will execute locally on the mobile phone $115_1$. The business logic layer 510 and data layer 515 will be resident on the service provider servers and the associated code will execute in the cloud.

FIG. 14 shows an illustrative arrangement 1400 in which certain functionality of the call reminder application 205, when configured as a thin client on the mobile phone $115_1$, is supported by the service provider 145 that is operatively coupled to the communications network 120. In this arrangement, a call 1405 from a caller $110_1$ to the user $105_1$ is either forwarded or rerouted as a call 1410 to the service provider 145. The particular methodology used to implement the redirection of the call can vary by implementation and may also depend on the commercial relationship between the service provider 145 and the user's phone service carrier. In some cases, the user $105_1$ can instruct the carrier to forward calls to the service provider 145 while in others the service provider 145 can implement call rerouting on behalf of the user per agreement between the user $105_1$ and the service provider 145.

The service provider 145 will relay the call 1415 to the user $105_1$ and then listen for call events 1420. Such monitoring can typically be performed using out-of-band ("OOB") signaling that is implemented, for example, through the mobile data network. Upon the occurrence of a qualifying call event, the service provider 145 will send a notification 1425 to the user $105_1$ including a prompt (e.g., prompt 1005 or 1125 in FIGS. 10 and 11) to generate a callback reminder and task. The user's interactions with the UI provided by the user experience layer 505 are captured as UI events (1430) and sent to the service provider 145 again typically using OOB signaling. When appropriate, the service provider 145 can establish the requisite link to the schedule application 220 and responsively initiate callback reminders and associated tasks (1435) which are then sent to the mobile phone $115_1$.

The service provider 145 may optionally send call data 1440 (such as call event history, call logs, and the like) and callback reminders and tasks 1445 to the user's PC 1450 using an Internet connection, for example. Such optional functionality advantageously ensures that reminders and tasks are replicated across a number of platforms that are used by the user $105_1$ without requiring an affirmative act of synchronization as described above in the text accompanying FIG. 3.

It is noted that, for the sake of clarity and ease of illustration in the description above, data, applications, and other executable application components such as operating systems are shown as discrete blocks, boxes, or other elements, although it is recognized and emphasized that such applications and components may reside at various times in different storage, memory, or processing components of any hardware host used and are executed by one or more processors in such host hardware.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. One or more computer-readable memories containing instructions which, when executed by one or more processors disposed in an electronic device that are operatively coupled to a communications network, perform a method for setting a callback reminder, the method comprising the steps of:

monitoring for call events associated with a call received at an electronic device from a caller, the call being carried by the communications network, the electronic device supporting voice telephony over the communications network and being capable of making or receiving calls;

fetching call data associated with the call in response to detecting a call event, the call data including at least a callback number for the caller;

launching a prompt, the prompt providing a selectable option to a user of the device for generating a callback reminder;

linking to a schedule for the user that is maintained by an application that runs on the device, the linking including locating a free time slot in the linked schedule for the callback reminder, or the linking including setting the callback reminder in the linked schedule at a predefined time interval after the call event;

accessing a task list that is maintained by an application that runs on the device and adding a callback task to the accessed task list; and launching the callback reminder in response to the linking step, the callback reminder being displayed on a UI (user interface) supported by the device and including the call data and a user-selectable control that initiates a call back to the caller's callback number upon actuation comprising a single click on the UI.

2. The one or more computer-readable memories of claim 1 in which the method includes a further step of generating the callback reminder in response to user selection of the option.

3. The one or more computer-readable storage media memories of claim 1 in which the schedule and task list are maintained by a single application that runs on the device.

4. The one or more computer-readable memories of claim 1 in which the call events include one of incoming call, rejected call, call waiting, missed call, or call that does not exceed a duration threshold, the duration threshold either being set to an arbitrary value or being user-settable.

5. The one or more computer-readable memories of claim 1 in which the call data further includes one of caller identity, date the call was received, or time the call was received.

6. The one or more computer-readable memories of claim 1 including a further step of exposing a UI to the user, the UI including one or more control elements arranged for one of selecting preferences associated with a callback reminder or configuring an application of the method as it operates on the device.

7. A mobile phone, comprising:
one or more processors for executing computer-executable instructions; and
one or more computer-readable memories for storing the computer-executable instructions, the instructions when executed by the one more processors implementing,
a) a call event listener arranged for listening for the occurrence of call events associated with a call received at the mobile phone from a caller,
b) a data handler for fetching call data associated with the received call in response to detecting a call event, the call data including at least a callback number for the caller,
c) processing logic for generating a callback reminder and for linking the generated callback reminder to one of a schedule or a task list that is stored on the mobile phone when a call event occurs, the linking including setting the callback reminder in the linked schedule at a predefined time interval after the call event, and the processing logic being further configured for accessing the task list that is maintained by an application that runs on the device and adding a callback task to the accessed task list, and
d) a UI (user interface) arranged for displaying the callback reminder including the call data to a user of the mobile phone on a UI device and for providing a user-selectable control device that, when actuated by the user using a single click on the UI, initiates a return call from the mobile phone to the callback number.

8. The mobile phone of claim 7 in which the callback reminder includes the fetched call data.

9. The mobile phone of claim 7 in which the link is established through an API (application programming interface).

10. The mobile phone of claim 7 in which the listener is registered with an operating system that executes on the phone.

11. The mobile phone of claim 7 in which the UI is further arranged to expose controls to the user to select qualifying call events, the occurrence of which triggers a prompt displayed on the display device for adding a callback task or callback reminder.

12. The mobile phone of claim 7 in which the UI is further arranged to expose controls to the user to specify preferences that are taken into account by the processing logic.

13. The mobile phone of claim 7 in which the processing logic is configured to query the schedule to find open time slots.

14. The mobile phone of claim 7 in which the processing logic is configured to set the callback reminder to launch at a predefined time.

15. A method for automatically generating callback reminders in response to call events associated with calls received at a device, the method comprising the steps of:
providing a UI (user interface) to a user of the device, the UI exposing user-selectable controls to trigger the generating of the callback reminders upon the occurrence of one or more of the call events, the call events associated with a call to the device from a caller;
interfacing with a service over a network, the service monitoring the call events and providing call handling options and the generated callback reminders to the UI responsively to the monitoring, the service creating a link to one of schedule and a task list associated with the user that are maintained by one or more applications that operate on the device, the link enabling tasks to be added to the task list and callback reminders to be inserted into the schedule, the callback reminder being inserted into either a free time in the linked schedule or the callback reminder being set in the linked schedule at a predefined time interval after the call event;
accessing the task list and adding a callback task to the accessed task list;
displaying the call handling options and generated callback reminders through the UI including call data and a user-selectable control; and
receiving a user input at the user-selectable control on the UI to initiate a callback to the caller responsively to the callback reminder, the user input comprising a single click on the UI.

16. The method of claim 15 in which the service is cloud-based and implements distributed computing between one or more servers associated with the service and the device.

* * * * *